United States Patent [19]

Krager

[11] Patent Number: 5,319,873
[45] Date of Patent: Jun. 14, 1994

[54] SYSTEM FOR POSITIONING A FISHING NET

[76] Inventor: William R. Krager, 3443 Bobbie Cir., Anchorage, Ak.

[21] Appl. No.: 35,292

[22] Filed: Mar. 22, 1993

Related U.S. Application Data

[63] Continuation-in-part of Ser. No. 886,234, May 21, 1992, Pat. No. 5,209,005.

[51] Int. Cl.$^5$ ............................................... A01K 71/00
[52] U.S. Cl. ............................................... 43/7; 43/9.1
[58] Field of Search ..................... 43/7, 9.8, 9.1, 8; 24/908, 115 H, 136 K, 17 B; 289/1.2, 1.5

[56] References Cited

U.S. PATENT DOCUMENTS

| | | |
|---|---|---|
| 2,408,367 | 10/1946 | Brickman . |
| 2,572,889 | 10/1951 | Strykower . |
| 3,213,560 | 10/1965 | Phillips . |
| 3,397,026 | 8/1968 | Spina . |
| 3,545,120 | 12/1970 | Takaoka . |
| 4,517,759 | 5/1985 | Wall . |
| 4,562,660 | 1/1986 | Cantor et al. . |
| 4,644,679 | 2/1987 | Ban . |
| 4,674,801 | 6/1987 | DiPaola et al. . |
| 4,693,031 | 9/1987 | Koetje . |
| 4,763,432 | 8/1988 | Barclay . |
| 4,805,334 | 2/1989 | Barclay . |
| 5,033,221 | 7/1991 | Barclay . |
| 5,209,005 | 5/1993 | Krager ............................... 43/7 |

Primary Examiner—P. Austin Bradley
Assistant Examiner—Chuck Y. Mah
Attorney, Agent, or Firm—William D. Hall

[57] ABSTRACT

A fishing net is suspended from a corkline. A monofilament line is formed into three loops which are clamped together. The first of these three loops forms a knot around the corkline and the other two loops weave through the fishing net to hold it in place. The first loop is wound around the corkline in one angular direction for about one turn. It then crosses the portion of the first loop that is below the corkline. It then again passes around the corkline but in an angular direction opposite said one direction. Afterward, a limited portion of the loop that was wrapped around the corkline is free. The other loops are then passed through this free limited portion and the knot it tightened.

8 Claims, 3 Drawing Sheets

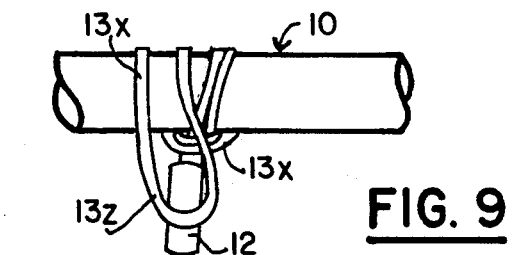
FIG. 9
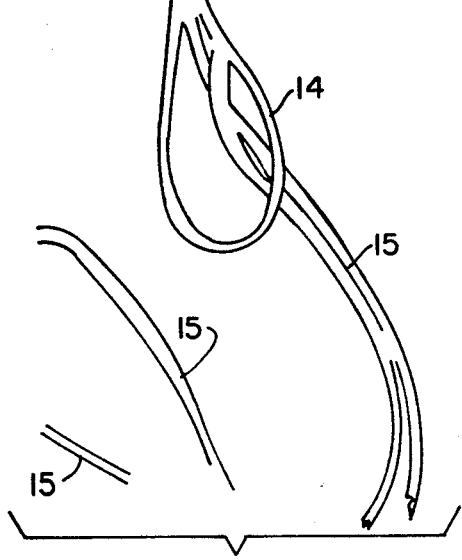
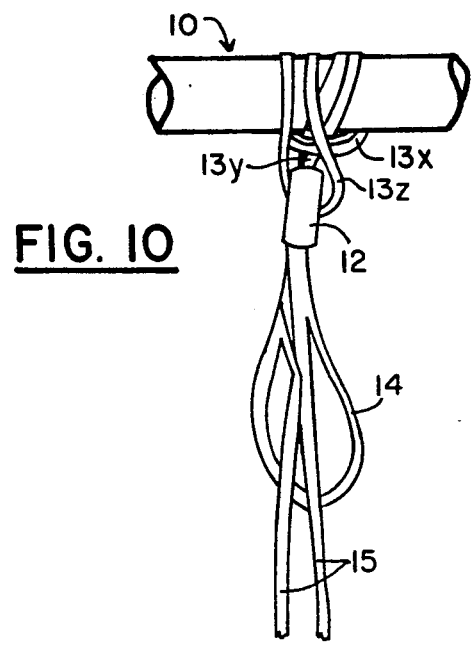
FIG. 10
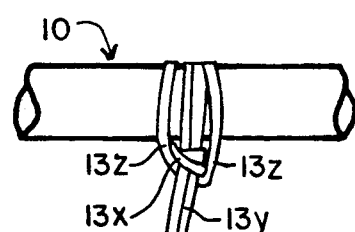
FIG. 11
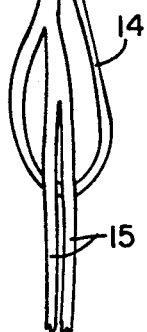

SYSTEM FOR POSITIONING A FISHING NET

RELATED APPLICATION

This application is a continuation-in-part of my prior co-pending application Ser. No. 07/886,234, filed May 21, 1992, entitled "System for Positioning A Fishing Net", now U.S. Pat. No. 5,209,005.

BACKGROUND OF THE INVENTION

The prior art commercial practice for hanging a fishing net from a floating corkline is well stated in lines 10 to 52 of column 1 of Barclay U.S. Pat. No. 4,763,432 granted Aug. 16, 1988 and entitled "Fishnet Hanging System". The forty-two lines from that patent, hereinabove cited, are incorporated herein by reference.

The aforesaid Barclay patent teaches that a hanging cord is threaded through the top selvage of the net or web of the fishnet assembly and is secured at regularly spaced locations to separate anchor blocks which in turn are secured to the fishnet corkline.

Moreover, U.S. Pat. No. 4,805,334 granted Feb. 21, 1989 to Barclay, in FIG. 21, illustrates a system for holding a net from a corkline wherein loops of cord extending from blocks 8L and 8R weave through the net to hold the net in place. The blocks 8L and 8R must be made special and without them the fisherman cannot use the system.

SUMMARY OF THE INVENTION

This invention relates to a system for hanging a fishing net from a corkline.

The invention utilizes a plurality of holding devices that are suspended from the corkline. Each holding device has three loops projecting from a sleeve. One loop projects upwardly from the sleeve and is used to hang the sleeve from the corkline. The other two loops project downwardly from the sleeve and may weave through each other and the net to hold the net in place.

The novelty in the present case resides in an improved knot for encircling the corkline. The loop that projects upwardly, as aforesaid, includes this knot to hold the loops in their proper positions relative to the corkline. With my special knot, the knot will not slip or slide along the corkline. To further secure the knot to the corkline a bonding agent may be used.

To form the knot the loop that projects upwardly is first wrapped around the corkline in a first angular direction. The first angular direction may be clockwise as viewed from one end of the corkline. The portion of the loop that has passed around the corkline now is moved across a portion of the loop below the corkline. The next step is to again wrap the loop around the corkline but this time the loop passes around the corkline in a second direction that is opposite to said first direction that is counterclockwise as viewed from said one end. A free end portion of the loop that was passed around the corkline remains, and projects away from the corkline. The final step is to pass the other loops and the holding device through the free end portion of the loop that projects away from the corkline. This forms a knot which is tightened so as to secure the knot to the corkline.

BRIEF DESCRIPTION OF THE DRAWINGS

FIG. 9 illustrates the fourth step in tying a knot, in loop 13, around the corkline 10.

FIG. 10 illustrates the fifth step in tying a knot, in loop 13, around the corkline 10.

FIG. 11 illustrates the final step in tying a knot, in loop 13, around the corkline 10.

DETAILED DESCRIPTION OF THE INVENTION

The invention employs a conventional corkline 10 from which net 17 hangs. The net is a web the upper part of which is the conventional selvage 16. For the purpose of this description and the claims the selvage 16 is considered part of the "net".

Figure 3:
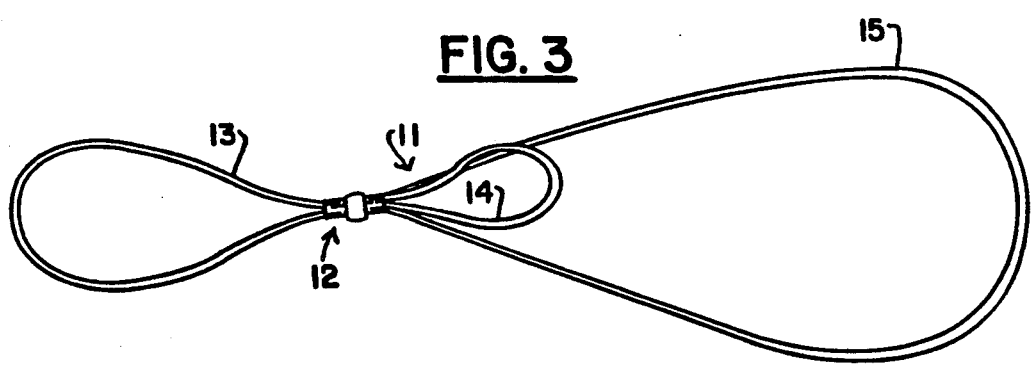
FIG. 3 is a side view of the holding device.

The net 17 hangs from the corkline by a series of holding devices 11 as shown in more detail in FIG. 3, where there is shown a crimped cylinder 12 having one loop 13 extending in one direction away from crimped cylinder 12; and first and second loops 14 and 15, respectively, extending away from crimped cylinder 12 in another direction.

Figure 1:
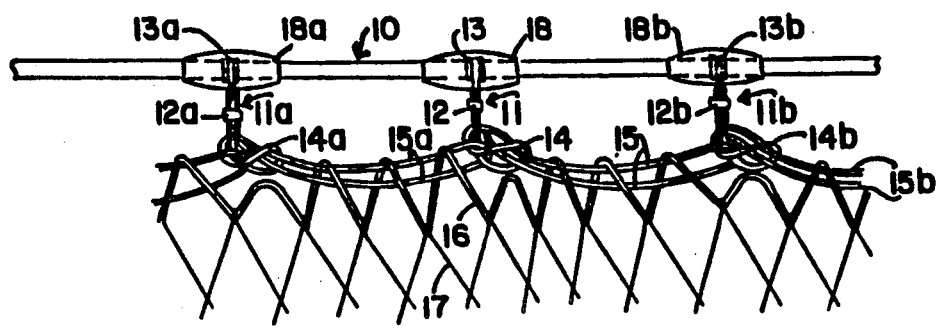
FIG. 1 is a side view of a fishing net 16, 17 held from a corkline 10.

The function of the loop 13 is to hold the crimped cylinder 12 below the corkline 10. As shown in FIG. 1 the loop 13 is tied around corkline 10 to hold the crimped cylinder 12 in place.

FIG. 1 shows the corkline 10 with three holding devices such as 11. All three holding devices 11, 11a and 11b are identical; which means that loops 13, 13a and 13b are identical; that loops 14, 14a and 14b are identical and that loops 15, 15a and 15b are identical.

To illustrate how the holding device 11 is connected to the net 16, 17 it is noted that loop 14 is passed through the free end of loop 15a of holding device 11a. The loop 15 is then passed through loop 14 and then through several openings in the net 16, 17 and is ultimately held in place by loop 14b.

To secure the loops 13, 13a and 13b in place a bonding agent 18 (FIGS. 1, 7) is applied to the loops 13, 13a and 13b and to the corkline 10. The preferred bonding agent is a hot glue applied with a brush while at 400° F. A suitable glue is known as Super Bond sold by Riddling Co. of Texas.

While I have shown only three holding devices 11, it is understood that the usual fishing net would require a great many holding devices spaced along the corkline 10 and the net 16, 17.

The loops 13, 14 and 15 are composed of a mono-filament line such as that known as Hi-Seas Mono Filament, sold by Hi-Seas Industries, Inc., 325 Spring Street, New York, N.Y. 10013. This single filament (mono-filament) line has a diameter of 1.8 milimeters and will rupture when placed under 250 pounds in tension. A single filament plastic line is preferred for the loops 13, 14 and 15, but the exact make and type described above is not required. That type, however, has "memory" which is very helpful when the holding devices are reused as they tend to correctly position themselves with very little effort on the part of the fisherman who is installing the net.

Figure 4:
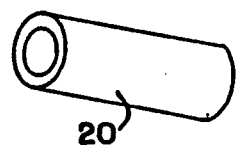
FIG. 4 illustrates a cylindrical metal piece which when crimped comprises part 12.
Figure 5:
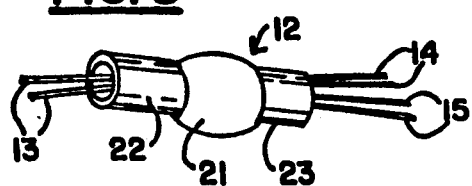
FIG. 5 is a side view of the cylinder of FIG. 4; the loops 13, 14 and 15 being included.

The crimped cylinder 12 may be made from a metallic cylinder 20 (FIG. 4). After the loops 13, 14 and 15 have been added to the cylinder the ends 22 and 23 of the cylinder are crimped as shown in FIG. 5. This secures the loops 13, 14 and 15 to the crimped cylinder 12. The central portion 21 of the crimped cylinder 12 (FIG. 5) is not crimped and maintains its original shape.

Figure 2:
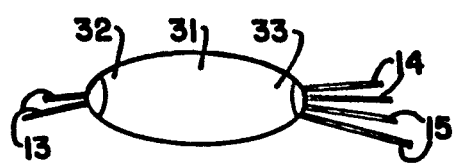
FIG. 2 shows the crimped device 12.

A modified form of crimped cylinder is shown in FIG. 2. To make this form of crimped cylinder the cylinder 20 of FIG. 4 has the mono-filament loops 13, 14 and 15 inserted in it. It is then crimped to a shape that has an elliptical cross-section wherein the two ends 32 and 33 are smaller than the center 31; see FIG. 3.

FIGS. 8 to 11 of my aforesaid prior co-pending application Ser. No. 886,234 show apparatus for forming the loops and performing the crimping step in the field.

The novelty in the present case resides in the knot, that is formed in loop 13, that extends around the corkline 10; and in the method of tying that knot.

FIGS. 6 to 11 show how the loop 13 of FIG. 3 is tied into a knot around the corkline 10.

For the purposes of simplifying this description it is noted that the portion of the loop 13 that extends above the corkline 10 of FIG. 6 bears reference number 13x and the portion below the corkline 10 is 13y.

Figure 6:
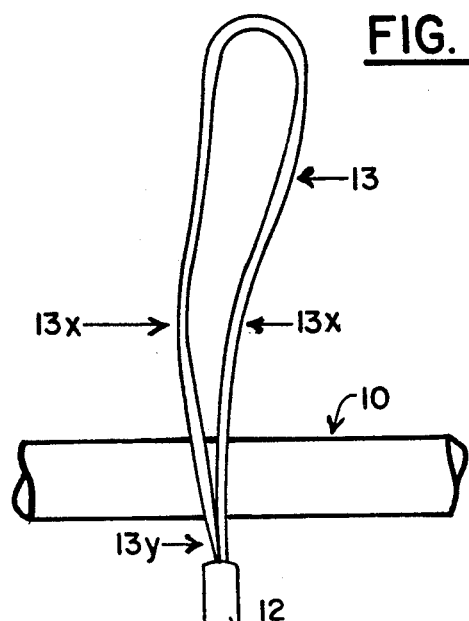
FIG. 6 illustrates the first step in tying a knot, in loop 13, around the corkline 10.

Positioning the loop 13 adjacent the corkline 10 as shown, for example, in FIG. 6, is the first step in forming the knot around the corkline 10.

Figure 7:
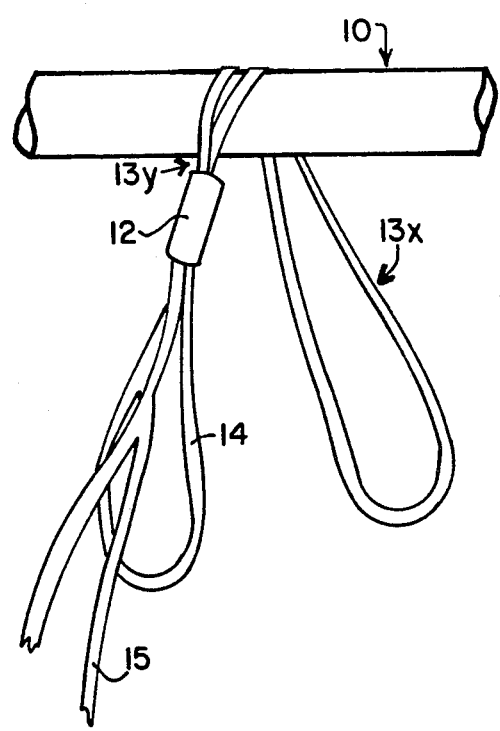
FIG. 7 illustrates the second step in tying a knot, in loop 13, around the corkline 10.

The second step in forming the knot is shown in FIG. 7 and comprises wrapping portion 13x of the loop 13 around the corkline 10.

Figure 8:
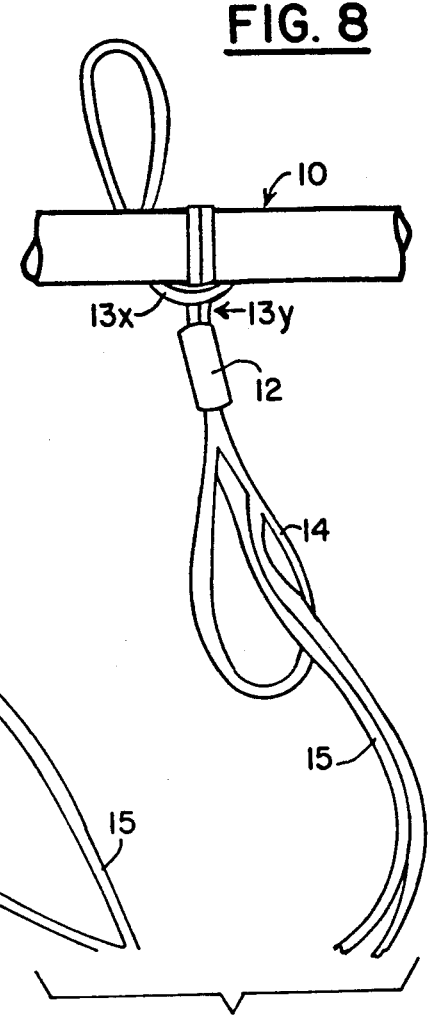
FIG. 8 illustrates the third step in tying a knot, in loop 13, around the corkline 10.

The third step in forming the knot is shown in FIG. 8 and comprises wrapping portion 13x about half way around portion 13y.

The fourth step in forming the knot around corkline 10 is shown in FIG. 9 where the portion 13x is again wrapped around the corkline 10.

It is noted that the wrapping operation of the fourth step goes around the corkline 10 in the opposite direction from the direction of the wrapping operation of the second step. In this regard assuming that a person was looking along the corkline from its left end as shown in FIGS. 7 and 9. Under this assumption the wrapping step of FIG. 7 went around the corkline 10 in a clockwise direction and the wrapping operation of FIG. 9 went around the corkline 10 counerclockwise. As a result a short loop portion 13z extending near the free end of loop 13 is free.

The fifth step in tying the knot around the corkline 10 comprises passing the loops 14 and 15 and the crimped sleeve 12 through the loop portion 13z, as shown in FIG. 10.

The final step in tying the knot around corkline 10 is shown in FIG. 11 and comprises pulling downwardly on the crimped sleeve 12 and/or on the loops 14 and 15 to tighten the knot around the corkline 10.

If desired the knot may be further secured to the corkline 10 by applying the bonding agent a aforesaid.

With the present invention, special equipment is not needed to connect the monofilament loops 13, 14 and 15 to the corkline 10. As long as the fisherman has his net, the sleeves 12 and a supply of monofilament line, the loops 13, 14 and 15 can be formed and the loop 13 tied to the corkline 10, using simple tools. Thus, with my invention no hard-to-find devices are required.

I claim to have invented:

1. Apparatus for supporting a fishing net from a horizontal support, comprising:
   a loop, of flexible material, that has a free end and also has first and second laps around the horizontal support, with the first lap comprising substantially at least one full 360 degree turn, extending in a first angular direction and the second lap comprising substantially at least one full 360 degree turn, extending around the horizontal support in a second direction,
   said loop having a first portion extending for a limited distance from said free end,
   said loop having a second portion between said laps,
   said loop having a third portion that is farther from said free end than said first lap,
   said loop having a fourth portion that is even farther from said free end than said third portion,
   said second portion of said loop crossing said fourth portion between said laps so that the second lap passes around the horizontal support in an angular direction opposite to the angular direction of said first lap,
   said fourth portion passing through said first portion and forming a knot, and
   means for supporting a fishing net from said fourth portion.

2. The method of suspending a fishing net from a horizontal support, comprising:
   providing a loop of flexible material,
   wrapping said loop at least partially around said support in a first angular direction, so that a portion of the loop extends at least partially around said support,
   passing a part of the loop at least partially around another part of the loop and then wrapping said loop at least partially around said support in a second angular direction which is opposite to said first direction, so that another portion of the loop extends at least partially around said support,
   forming said loop into a knot around said support, and
   fastening a fishing net to said loop.

3. The method of claim 2 in which one portion of said loop is passed over another portion of said loop between said first and second wrapping steps so that the second wrapping step proceeds in the opposite direction from the first named wrapping step.

4. The method of claim 2 in which the step of forming a knot comprises:
   providing the loop with a free end and with a limited length thereof that extends away from the portion of the loop that passes around the support in said first angular direction and
   passing at least part of said limited length through the loop near said free end.

5. A knot formed around an object, comprising:
   a loop having a free end, said loop comprising a pair of adjacent elongated flexible elements joined together at said free end,
   said loop extending around the object in a first angular direction,
   a portion of said loop that has been around the object crossing another portion of the loop,
   said loop further extending around said object in a second angular direction that is opposite to said first angular direction, said loop after extending around the object in said second angular direction having a free end portion projecting away from said object, and at least a part of said loop passing through said free end portion to complete the knot.

6. A knot as defined in claim 5 in which said object is a corkline, and a fishing net carried by said knot.

7. A knot as defined in claim 5 in which said object is a support for a fishing net, and means for suspending a fishing net from said loop.

8. A knot as defined in claim 7 having means for holding said two flexible elements together.

* * * * *

UNITED STATES PATENT AND TRADEMARK OFFICE
CERTIFICATE OF CORRECTION

PATENT NO. : 5,319,873
DATED : June 14, 1992
INVENTOR(S) : William R. Krager

It is certified that error appears in the above-indentified patent and that said Letters Patent is hereby corrected as shown below:

On title page, item [54] and column 1, line 2,

The title of the invention "SYSTEM FOR POSITIONING A FISHING NET" should be corrected to read: --Knot Made of a Loop of Flexible Material--.

Signed and Sealed this

Fifteenth Day of November, 1994

Attest:

BRUCE LEHMAN

*Attesting Officer*   *Commissioner of Patents and Trademarks*